April 21, 1942.    C. D. STROMGREN    2,280,557
PISTON RING COMPRESSOR
Filed Nov. 1, 1940
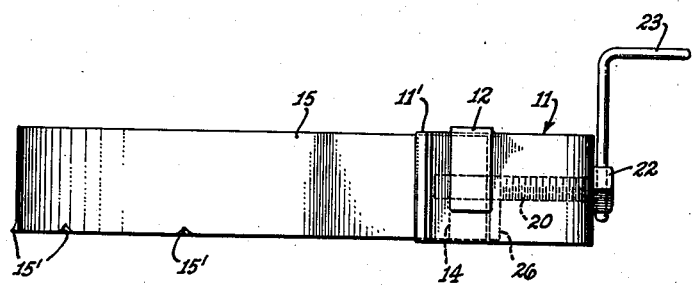
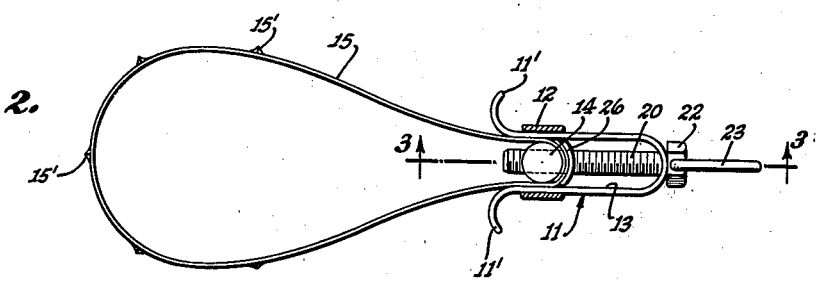
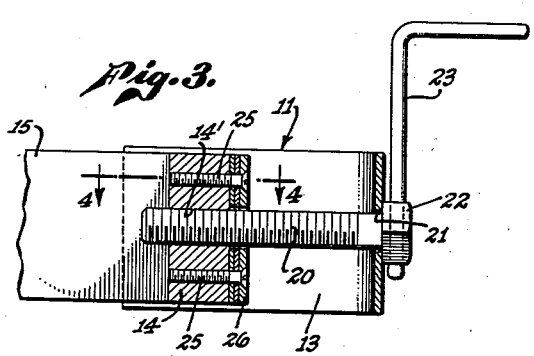
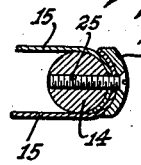
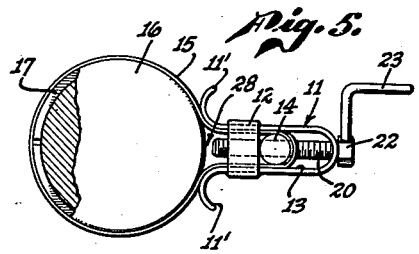
Inventor
CHARLES D. STROMGREN,
By William R. Graham
Attorney Patented Apr. 21, 1942

2,280,557

UNITED STATES PATENT OFFICE 2,280,557

PISTON RING COMPRESSOR

Charles D. Stromgren, Los Angeles, Calif.

Application November 1, 1940, Serial No. 363,954

1 Claim. (Cl. 29—86.4)

This invention relates generally to piston ring compressor tools for use in contracting piston rings installed on a piston so that the piston and rings may be easily inserted in the cylinder of an internal combustion engine or the like.

The ordinary types of piston ring compressor tools with which I am familiar embody a band wound spirally together with additional means for constricting the convolutions of the band. The constricting means is ordinarily a separate band encircling the main or piston ring engaging band or an end of the main band itself wound about a rotatable post or the like. The ordinary types of tool are thus disadvantageous in that due to the inherent friction of the spiral bands they are difficult to operate either to expand or contract the main band and require the use of a separate tool such as a screwdriver or the like for tightening or loosening them and in many cases require also the use of a second tool to operate a set screw or other locking means to hold the band when tightened.

It is a further disadvantage of piston ring compressors embodying a spiral band in that with this construction it is impossible to engage the piston rings with a concentric constricting member. As a result it often happens that the piston rings are not completely concentrically compressed or contracted and when the piston is inserted in the cylinder the lower or wiping edge of the rings may engage the cylinder block so that when the piston is tapped to get it into the cylinder the edge of the rings may be damaged.

It therefore is a primary object of this invention to provide a new and improved tool which may be easily operated to compress piston rings installed on a piston so that the piston may be inserted in the cylinder without any danger of injury to the rings.

It is a particular object to provide a piston ring compressor embodying a band which is engageable with the periphery of the piston rings and means associated with the band for constricting the band or tightening it about the rings to a position in which the major portion of the band is concentric with the periphery of the piston.

It is a further object to provide a tool of the type indicated which may be readily expanded or contracted by the turning of a single element and which is so constructed as to embody little or practically no inherent friction.

It is also an object to provide a piston ring compressor so formed that it is possible to observe a portion of the piston rings at the joint ends or other predetermined point of their peripheries.

These and other objects will be apparent from the drawing and the following description thereof. Referring to the drawing which is for illustrative purposes only;

Fig. 1 is a side view of a piston ring compressor embodying the invention;

Fig. 2 is a plan view of the tool of Fig. 1;

Fig. 3 is a fragmentary sectional elevation taken on line 3—3 of Fig. 2;

Fig. 4 is a detailed sectional plan view on line 4—4 of Fig. 3;

Fig. 5 is a plan view of the tool shown associated with a piston and piston rings with the rings in compressed or contracted position, part of the piston being broken away to show a portion of the upper ring; and Fig. 6 is a fragmentary plan view of a tool embodying another form of the invention.

More particularly describing the invention, reference numeral 11 generally indicates a frame which in the form of the invention shown is comprised of a strip of metal or the like having suitable strength characteristics and bent or formed in a general U-shape. The ends of the frame are flared at 11' as shown in Fig. 2. Preferably a bracing strip 12 is employed extending over the top of the frame and down each side and secured to the sides in any suitable manner. This frame provides what will be termed a guide channel 13 inside of the frame which is adapted to slidably accommodate a member 14 to which is adapted to be attached a flexible band 15. It is contemplated that the shape of the frame may be changed as desired so long as an elongated channel which is open at one end to receive the band is provided. The band 15 may be made of flexible sheet metal or the like and is adapted to surround a piston 16 and the piston rings 17 associated therewith as shown in Fig. 5.

In order to constrict the band 15 about a piston to compress or contract the rings in the grooves of the piston, means are provided for moving the member 14 longitudinally of the frame in the guide channel so as to draw a portion of the band 15 within the guide channel. The member 14, which will be termed a cross nut, is provided with a threaded bore 14' which is adapted to receive an elongate member 20 having screw threads thereon. This member or rod 20 extends longitudinally of the frame and through an opening 21 at the closed end of the frame. At its outer end the rod 20 is provided with an abutment means or head 22 which accommodates an operating handle 23. It is apparent that by manipulating the handle the screw threaded rod 20 may be rotated to cause longitudinal movement of the cross nut 14 in the guide channel 13 of the frame.

In order that the band 15 will move with the cross nut 14, the ends of the band are overlapped behind the cross nut as best illustrated in Figs. 3 and 4 and provided with suitable openings to accommodate screws 25 and the rod 20. A clamp plate 26 is employed over the overlapped ends of the band.

With this construction the flexible band 15 may be readily positioned over a piston to surround its associated piston rings and contracted thereabout to compress or contract the piston rings into their grooves by manipulation of the handle 23 to turn the rod 20 in a direction to cause movement of the cross nut 14 away from the piston. During this operation the flared ends 11' of the frame are brought to a position substantially tangential to the piston being separated therefrom only by the thickness of the band portions interposed between them and the piston. If desired in the operation of the device, the split portions of the piston rings may be so related to the piston ring compressor as to bring the ends of the rings in the region indicated at 28 where they may be observed to insure that the rings are properly contracted.

It is apparent that the device provides a band 15 which may be drawn or tightened concentrically with the piston 16 and will thereby insure the proper concentric compression of the rings so that when the piston is inserted in the cylinder there will be no danger of injury to the lower edges of the rings. In this connection, in the installation of a piston in the cylinder, the lower portion of the piston is first introduced into the cylinder until the lower edge of the frame 11 and band 15 contacts the surface of the cylinder block surrounding the cylinder. To prevent any possibility of the band entering the cylinder the band is provided with a plurality of flared portions 15'. The upper end of the piston may then be tapped to move it out of the band 15 and into the cylinder.

After the operation has been performed, it is obvious that by manipulating the handle 23 to move the cross nut outwardly in the channel 13, the band is readily expanded to receive a second piston.

Although a particular means has been shown for securing the band 15 to the cross nut 14 it is contemplated that various means may be used for accomplishing this and for example an endless band 15a (Fig. 6) may be employed. While it is desirable to eliminate the use of a clamp such as the clamp 26, and associated screws 25, the band may merely be loosely positioned around the rear surface of the cross nut as shown in Fig. 6 and a follower spring 30 employed between the band and the inner surface of the end of the frame 11 to insure the band following the cross nut when the same is moved toward the open end of the frame.

Although the invention has been shown and described with reference to particular forms, it is contemplated that various changes and modifications may be made within the scope of the invention and it is intended to cover such changes as come within the claim.

I claim as my invention:

A piston ring compressor comprising a U-shaped frame formed of flat metal strip stock having parallel legs and a connecting web portion, the free ends of the legs being curved outwardly; said frame forming an open-sided channel, said web being provided with an opening therein, an oblong nut in said channel provided with an opening registering with the opening in said web, one of said openings being threaded, a shaft passing through said openings and threaded into said threaded opening and means on said shaft whereby the same may be turned to move the nut in the channel, a piston and ring engaging band of thin flexible sheet metal secured to said nut and having its major portion extending beyond said frame, and a minor portion thereof lying in said channel and movable along the channel by movement of said nut, and a narrow reinforcing member connecting the parallel legs at one of said open sides and also serving to limit movement of the band laterally of the frame in one direction.

CHARLES D. STROMGREN.